United States Patent [19]
Wajima et al.

[11] Patent Number: 5,780,377
[45] Date of Patent: Jul. 14, 1998

[54] LIGHT-TRANSMISSIVE CERAMICS AND METHOD OF MANUFACTURING SAME

[75] Inventors: Naohito Wajima; Tetsuaki Bundo; Koichi Hayashi, all of Fukuoka, Japan

[73] Assignee: Toto Ltd., Fukuoka, Japan

[21] Appl. No.: 433,235

[22] Filed: May 2, 1995

[51] Int. Cl.$^6$ .......................... C04B 35/10; C04B 35/50; C04B 35/645

[52] U.S. Cl. .................................... 501/152; 501/153

[58] Field of Search .......................... 501/152, 153

[56] References Cited

U.S. PATENT DOCUMENTS

| | | | |
|---|---|---|---|
| 3,026,210 | 3/1962 | Coble | 501/153 |
| 3,834,915 | 9/1974 | Cleveland et al. | 501/153 |
| 4,150,317 | 4/1979 | Laska et al. | 501/153 |
| 4,182,972 | 1/1980 | Kaneno et al. | 501/152 |
| 4,214,666 | 7/1980 | Oda et al. | 501/152 |
| 4,222,978 | 9/1980 | Oda et al. | 501/153 |
| 4,699,774 | 10/1987 | Prud'Homme Van Reine et al. | 501/152 |
| 4,762,655 | 8/1988 | Rhodes et al. | 501/153 |
| 4,841,195 | 6/1989 | DeWith et al. | 501/152 |
| 4,861,737 | 8/1989 | Prud'Homme Van Reine et al. | 501/152 |
| 5,075,267 | 12/1991 | Fujii et al. | 501/126 |
| 5,484,750 | 1/1996 | Greskovich et al. | 501/152 |

FOREIGN PATENT DOCUMENTS

| | | |
|---|---|---|
| 0380011 | 8/1990 | European Pat. Off. |
| 0381524 | 8/1990 | European Pat. Off. |
| 57-37554 | 8/1982 | Japan |
| 58-185478 | 10/1983 | Japan |
| 59-138047 | 8/1984 | Japan |
| 59-184450 | 10/1984 | Japan |
| 63-230550 | 9/1988 | Japan |
| 369859 | 11/1991 | Japan |
| 4193760 | 7/1992 | Japan |
| 4370643 | 12/1992 | Japan |
| 1597162 | 9/1981 | United Kingdom |

OTHER PUBLICATIONS

Chemical Abstracts, vol. 117, No. 22, 30 Nov. 1992, Columbus OH, abstract No. 218585a, p. 413, col. R.

Patent Abstracts Of Japan, vol. 177 (C-1145), 17 Sep. 1993, abstract, JP-A-05238810.

Database WPI, Week 8716, Derwent Publications Ltd., Great Britain, AN87-113121 & JP-A-62059526, 16 Mar. 1987.

Chemical Abstracts, vol. 82, No. 8, 24 Feb. 1975, Columbus OH, abstract No. 47141e, p. 258, col. L.

Database WPI, Week 7423, Derwent Publications Ltd., Great Britain, AN74-42881v & JP-B-49019085, 15 May 1974.

Patent Abstracts Of Japan, vol. 011, No. 030 (C-400), 29 Jan. 1987, abstract, JP-A-61201619 06 Sep. 1986.

"Effect of processing conditions on the characteristics of pores in hot isostatically pressed alumina" Journal Of Materials Science, vol. 28, 1993, pp. 1788-1792, K. Uematsu et al. no month!.

*Primary Examiner*—Mark L. Bell
*Assistant Examiner*—Louis M. Troilo
*Attorney, Agent, or Firm*—Weiner, Carrier, Burt & Esser, P.C.; Joseph P. Carrier; Irving M. Weiner

[57] ABSTRACT

Light-transmissive ceramics are disclosed composed of a plurality of oxides each having a negative standard Gibbs energy of formation ($\Delta Gf^0$) with an absolute value greater than 1581.9 KJ/mol. The light-transmissive ceramics are produced by subjecting the oxides to hot isostatic pressing at a high temperature under a high pressure after they have been subjected to primary sintering. The light-transmissive ceramics of $Al_2O_3/La_2O_3$ are of a composite structure with particles of $La_2O_3$ being present between particles of $Al_2O_3$, rather than $Al_2O_3$ and $La_2O_3$ forming a solid solution. In the composite structure, the particles of $La_2O_3$ have sizes that are $1/3$ to $1/30$ of the particles of $Al_2O_3$. Maximum size particles of $Al_2O_3$ have a longer axis of 30 µm or less and a shorter axis of 20 µm or less, and maximum size particles of $La_2O_3$ or the like have a longer axis of 10 µm or less and a shorter axis of 5 µm or less. Before an a molded ceramics body is fully fired, it may be processed by a chelating agent, and perhaps also with hydrofluoric acid, to remove impurities therefrom for improving characteristics of the light-transmissive ceramics.

11 Claims, 11 Drawing Sheets

F I G. 2
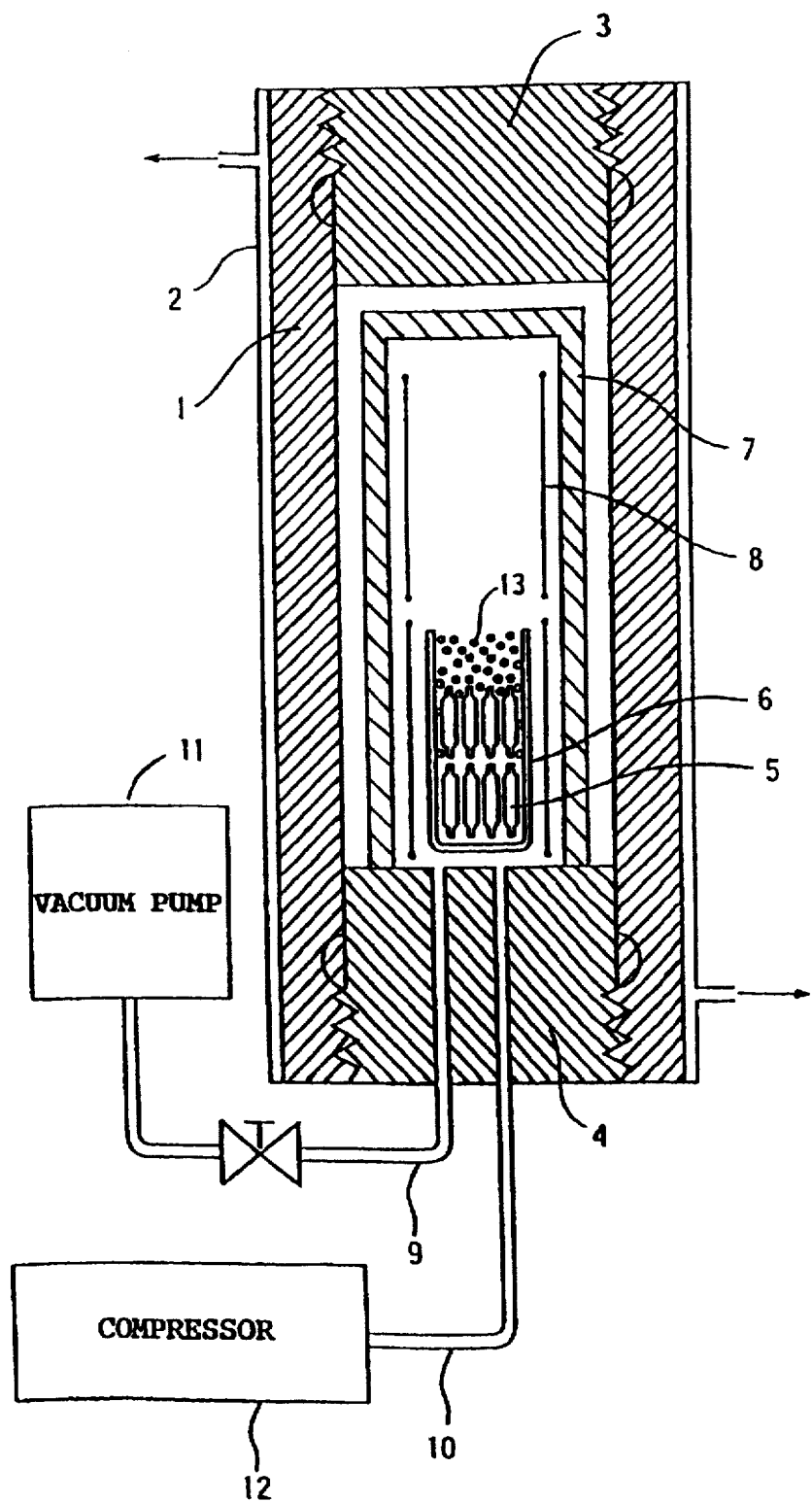

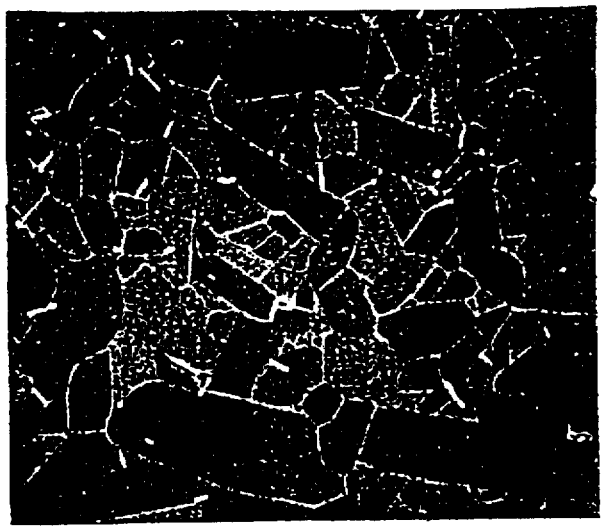
FIG. 5 (A 3)
040948
La$_2$O$_3$ 0.06 wt % (1580°C HIP)
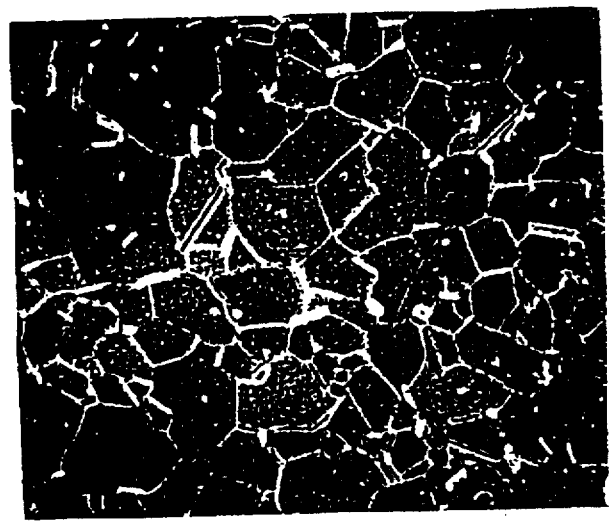
FIG. 5 (A 2)
020118
La$_2$O$_3$ 0.5 wt% (1800°C HIP)
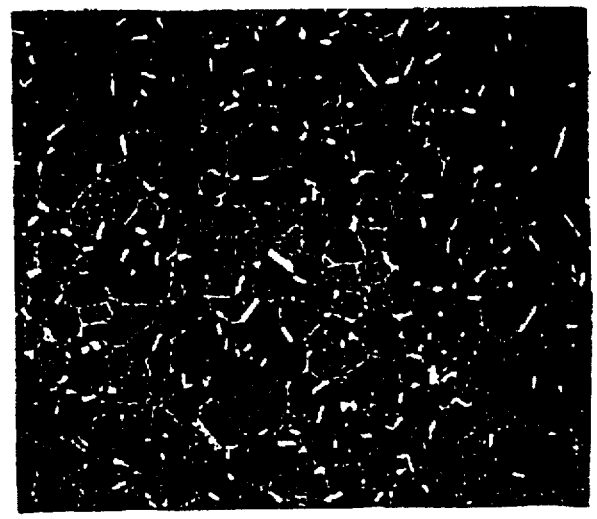
FIG. 5 (A 1)
040935
La$_2$O$_3$ 0.5 wt% (1580°C HIP)

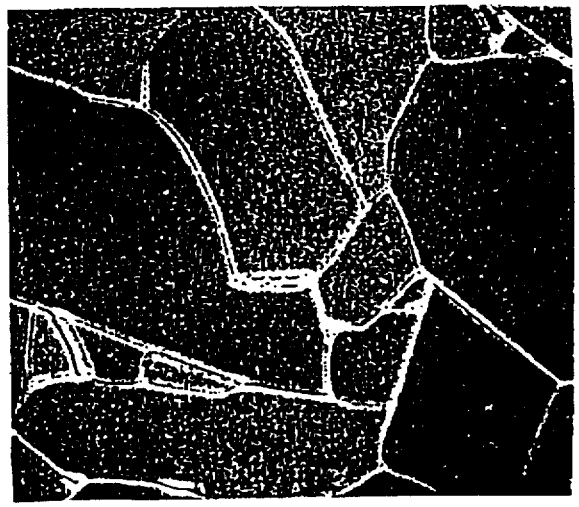
FIG. 6 (B 3)
012815
La₂O₃ NOT ADDED (1800°C HIP)
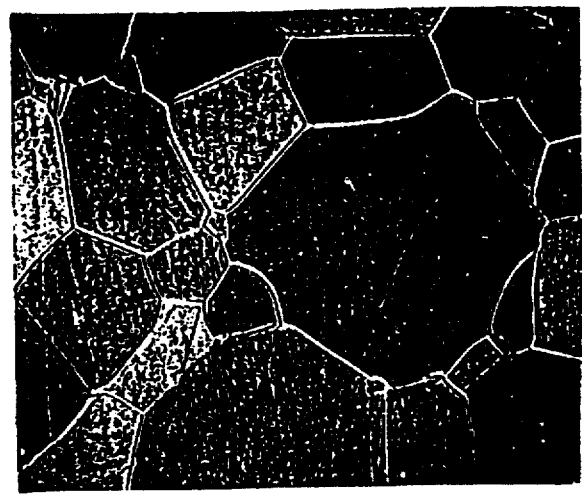
FIG. 6 (B 2)
011122
MgO 0.05 wt% H₂ ATMOSPHERE
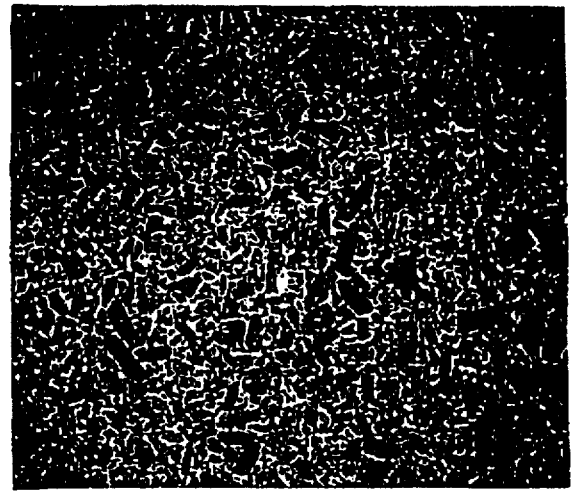
FIG. 6 (B 1)
041909
La₂O₃ NOT ADDED (1350°C HIP)

AVERAGE CRYSTAL PARTICLE DIAMETER OF $Al_2O_3$ (μm)

AVERAGE CRYSTAL PARTICLE DIAMETER OF $Al_2O_3$ (μm)

LIGHT-TRANSMISSIVE CERAMICS AND METHOD OF MANUFACTURING SAME

TECHNICAL FIELD

The present invention relates to light-transmissive ceramics composed of polycrystalline alumina or the like and a method of manufacturing such light-transmissive ceramics. More particularly the invention pertains to light-transmissive ceramics that can be used as a material of a light-emitting bulb for a high-intensity discharge lamp such as a metal-halide lamp and a method of manufacturing such light-transmissive ceramics.

BACKGROUND ART

High-intensity discharge (HID) lamps such as metal halide lamps have attracted much attention for use as light sources for illuminating devices in buildings and also for overhead projectors (OHD) and color liquid-crystal projectors. Such a high-intensity discharge lamp comprises a light-transmissive, light-emitting bulb containing a metal halide such as $ScI_3$ sealed therein. When a high voltage is applied between electrodes disposed in the light-emitting bulb, an arc discharge is generated to evaporate the sealed metal halide with the heat of the arc discharge into a metal and a halogen for thereby enabling the light-emitting bulb to emit light in a color peculiar to the metal.

The light-transmissive, light-emitting bulbs have heretofore been made of quartz ($SiO_2$). However, since quartz has poor corrosion resistance and insufficient thermal shock resistance, there has been proposed a high-intensity discharge lamp having a light-emitting bulb made of light-transmissive alumina (polycrystalline alumina). Light-transmissive alumina for use as a material a of light-emitting bulb is required to have high mechanical strength and linear transmittance (in-line transmittance).

It has been proposed to produce polycrystalline alumina of uniform structure by firing highly pure alumina with a small amount MgO added as a grain growth inhibitor, as disclosed in U.S. Pat. No. 3,026,210, or to add $La_2O_3$ and $Y_2O_3$ besides MgO for producing a grain boundary phase and further to equalize the diameters of alumina crystal particles for increased in-line transmittance, as revealed in Japanese patent publication No. 57-37554.

Processes of firing a molded body produced by a casting process in an $H_2$ atmosphere at a temperature of 1700° C. or higher in order to increase the linear transmittance and the freedom for shapes of light-emitting bulbs are disclosed in Japanese laid-open patent publications Nos. 59-138047 and 59-184450 and Japanese patent publication No. 3-69859. In these processes, a light-emitting bulb having smaller-diameter opposite ends and a larger-diameter barrel is molded according to slip-casting, and then fired in an $H_2$ atmosphere, so that the produced light-emitting bulb has an excellent light-emitting capability with no air bubbles present therein.

According to the process in which MgO is added to highly pure alumina, MgO makes a solid solution with $Al_2O_3$, producing a structure different from the crystalline structure of $Al_2O_3$ in the crystal grain boundary of $Al_2O_3$ (interstitial solid solution). Since the polycrystalline alumina thus produced has a stoichiometric deviation and hence a nonstoichiometric extent, an oxygen defect occurs which is responsible for the absorption of black bodies. This tendency manifests itself in vacuum at high temperatures, i.e., under conditions in which high-intensity discharge lamps are used.

According to the process in which $La_2O_3$ and $Y_2O_3$ are added besides MgO, abnormal grain growth tends to be promoted at high temperatures higher than 1700° C. Even if the produced light-emitting bulb has attained the desired light-transmissive property, it has very poor thermal shock resistance and mechanical strength.

Furthermore, the added MgO has a smaller standard Gibbs energy of formation ($\Delta Gf°$) than $Al_2O_3$, and low thermodynamic stability. If MgO is used as a material of a light-emitting bulb, it is apt to react with materials sealed in the light-emitting bulb, particularly Sc (scandium) and MgO present in the grain boundary of $Al_2O_3$, resulting in corrosion.

Efforts to increase the particle diameter to reduce internal diffusion pose a certain limitation on an increased light-transmitting capability. The light-transmitting capability may be increased by grinding the surface of light-transmissive ceramics to reduce the surface roughness (Ra) thereof. However, no light-transmissive ceramics strong enough to withstand machining has been obtained so far.

Even when a light-emitting bulb is made of highly pure alumina, it still contains certain amounts of impurities including Mg, Ca, Si, Fe, Cr, Ni, etc.

When Mg (MgO) is contained, it causes the following reaction, eliminating a light-emitting substance ($ScI_3$):

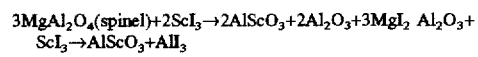

$3MgAl_2O_4(spinel)+2ScI_3 \rightarrow 2AlScO_3+2Al_2O_3+3MgI_2\ Al_2O_3+ScI_3 \rightarrow AlScO_3+AlI_3$ If the impurities of Mg, etc. are minimized, then it is possible to extend the service life of the high-intensity discharge lamps. However, it is difficult to physically remove those impurities in the form of minute particles. One process of chemically removing such impurities using a chelating agent is disclosed in Japanese laid-open patent publication No. 63-230550.

According to the disclosed process, a sulfide mineral contained in a clay mineral is separated by reaction with a chelating agent.

When impurities are removed from a powdery ceramic material in the production of a light-emitting bulb according to the disclosed process, however, the problem of the elimination of the light-emitting substance in a short period of time is not sufficiently solved.

DISCLOSURE OF THE INVENTION

In view of the above drawbacks, it is an object of the present invention to provide light-transmissive ceramics having excellent linear transmission, mechanical strength, thermal shock resistance, and corrosion resistance, and a method of manufacturing such light-transmissive ceramics.

The present invention has been achieved based on the recognition of the fact that the light transmittance of light-transmissive ceramics can be increased by meeting the requirements that (a) no air bubbles be contained in the light-transmissive ceramics, (b) the light-transmissive ceramics have a small surface roughness (Ra), (c) the light-transmissive ceramics be free of abnormal grain growth, and (d) the light-transmissive ceramics be made of a material having a negatively large standard Gibbs energy of formation ($\Delta Gf°$) for higher corrosion resistance.

According to the present invention, light-transmissive ceramics are composed of a plurality of oxides each having a negative standard Gibbs energy of formation ($\Delta Gf°$) having an absolute value greater than 1581.9 KJ/mol, the light-transmissive ceramics being produced by subjecting the oxides to hot isostatic pressing at a high temperature under a high pressure. The light-transmissive ceramics comprise a composite body in which particles of at least one of the oxides, different from $Al_2O_3$, are present between particles of $Al_2O_3$ which is one of the oxides, and preferably, maximum size particles of $Al_2O_3$ have a longer axis of 30 µm or less and a shorter axis of 20 µm or less, and maximum size particles of the at least one of the oxides have a longer axis of 10 µm or less and a shorter axis of 5 µm or less. Preferably, the light-transmissive ceramics contain a principal component of $Al_2O_3$ and an auxiliary component comprising an oxide selected from the group consisting of $La_2O_3$, $Ta_2O_3$, $Ho_2O_3$, $Y_2O_3$, $Yb_2O_3$, $Dy_2O_3$, $Sc_2O_3$, $Ce_2O_3$, $Er_2O_3$, $Lu_2O_3$, $Sm_2O_3$, and $Tm_2O_3$. According to the present invention, a method of manufacturing light-transmissive ceramics comprises the steps of adding 0.01–18 wt % of particles of an oxide in the form of at least one of a salt and an oxide to a powder of highly pure alumina to form a molded ceramics body, holding the molded ceramics body in an atmosphere of at least one of vacuum, atmospheric air, $N_2$, Ar, $H_2$, and water vapor at a primary sintering temperature ranging from 1350° C. to 1800° C. for at least 0.5 hour, thereby producing a primary sintered body, and then subjecting the primary sintered body to hot isostatic pressing at a high temperature under a high gas pressure.

The present invention has also been achieved on the basis of the finding that even if impurities are removed from the materials using a chelating agent, when the completed light-transmissive ceramic is used as a material of a light-emitting bulb for a high-intensity discharge lamp, impurities newly introduced while the molded ceramics body is being produced are mainly responsible for the elimination of a light-emitting substance from the light-emitting bulb.

According to the present invention, there are also provided light-transmissive ceramics composed of a plurality of oxides each having a negative standard Gibbs energy of formation ($\Delta Gf°$) having an absolute value greater than 1581.9 KJ/mol, the light-transmissive ceramics being produced by at least processing the oxides with a chelating agent before being fired, and subjecting the oxides to hot isostatic pressing at a high temperature under a high pressure. Preferably, the light-transmissive ceramics comprise a composite body composed of a principal constituent of $Al_2O_3$ and particles of $La_2O_3$ present between particles of $(Al,Sc)_2O_3$, which is equivalent to $Al_2O_3$ where part of Al is replaced with Sc. According to the present invention, there is further provided a method of manufacturing light-transmissive ceramics, comprising the steps of mixing a powdery ceramics material, a binder, and a deflocculant to produce a molded body of a predetermined shape, preliminarily firing the molded body, thereafter impregnating the preliminarily fired body with a chelating agent to allow ions of impurity metals in the preliminarily fired body to be coupled to the chelating agent, removing the chelating agent impregnated in the preliminarily fired body by cleaning, and firing the preliminarily fired body into a fully fired body.

BRIEF DESCRIPTION OF THE INVENTION

FIG. 2 is a cross-sectional view of a device used in the hot isostatic pressing step;

Figure 1:
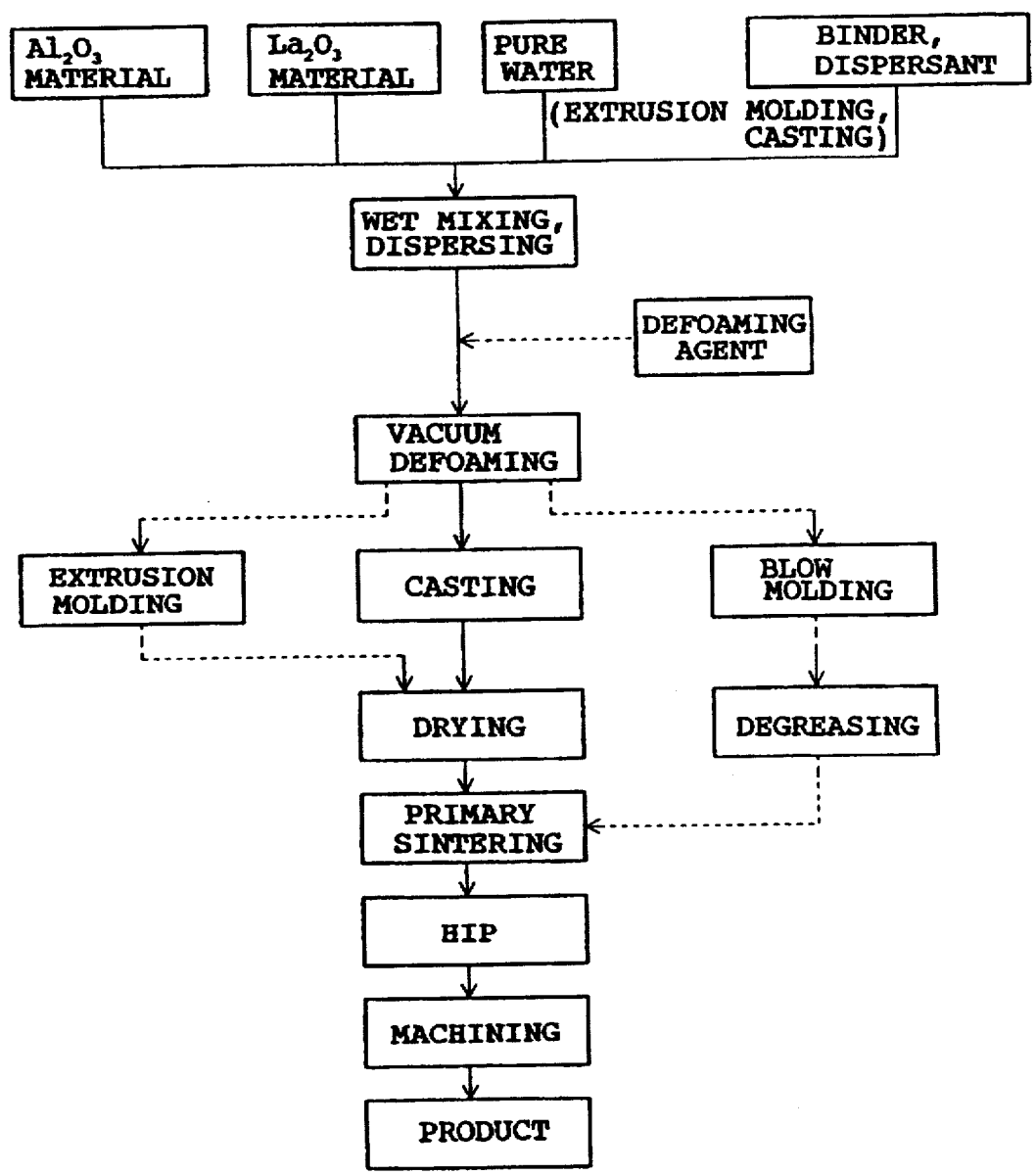
FIG. 1 is a block diagram of a method of manufacturing light-transmissive ceramics of $La_2O_3/Al_2O_3$ according to a first embodiment of the present invention, the process including a hot isostatic pressing (HIP) step.
Figure 7:
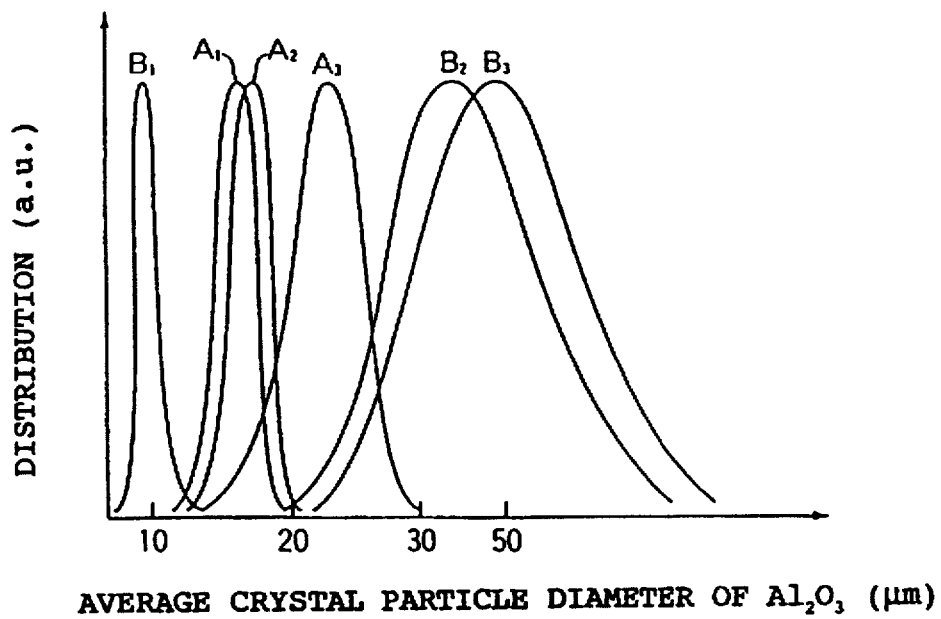
Figure 8:
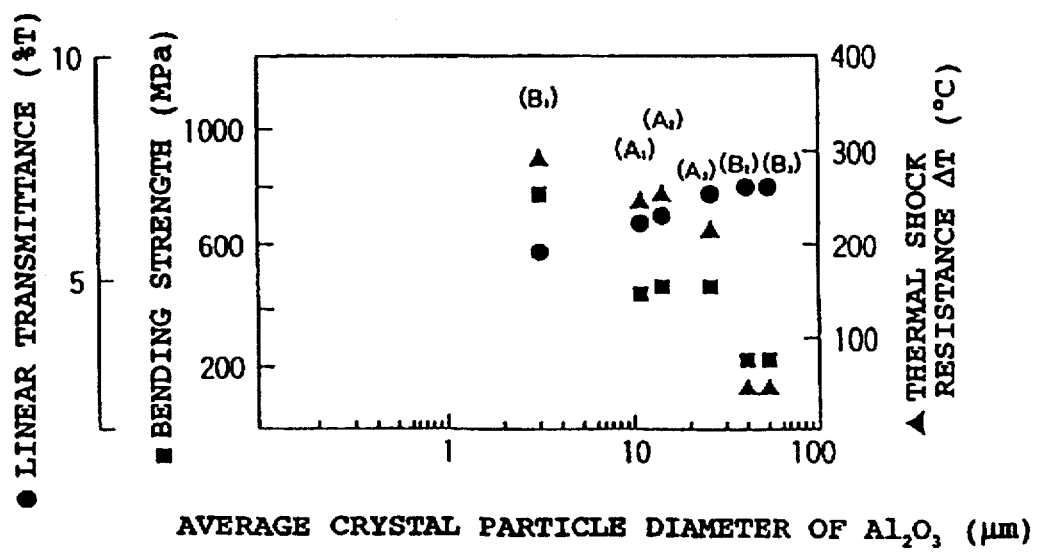
Figure 9:
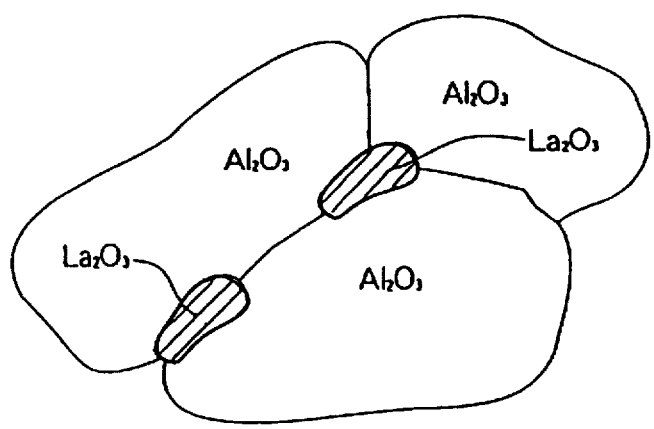
Figure 10:
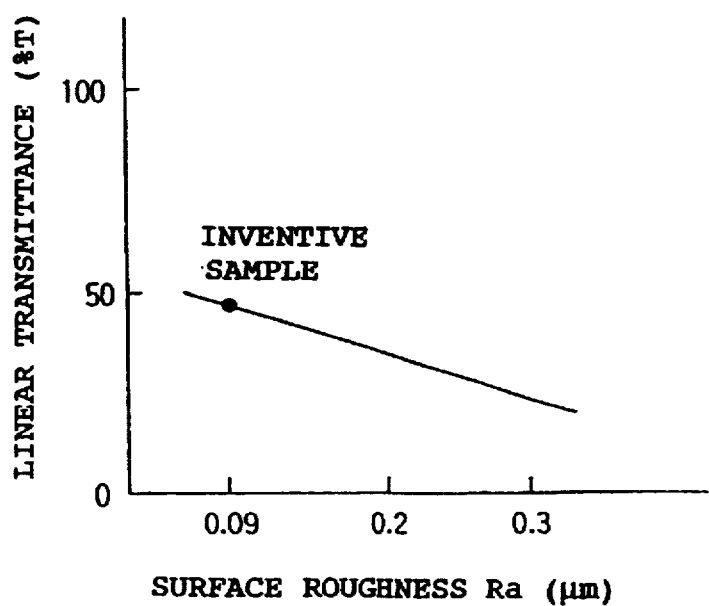
Figure 11:
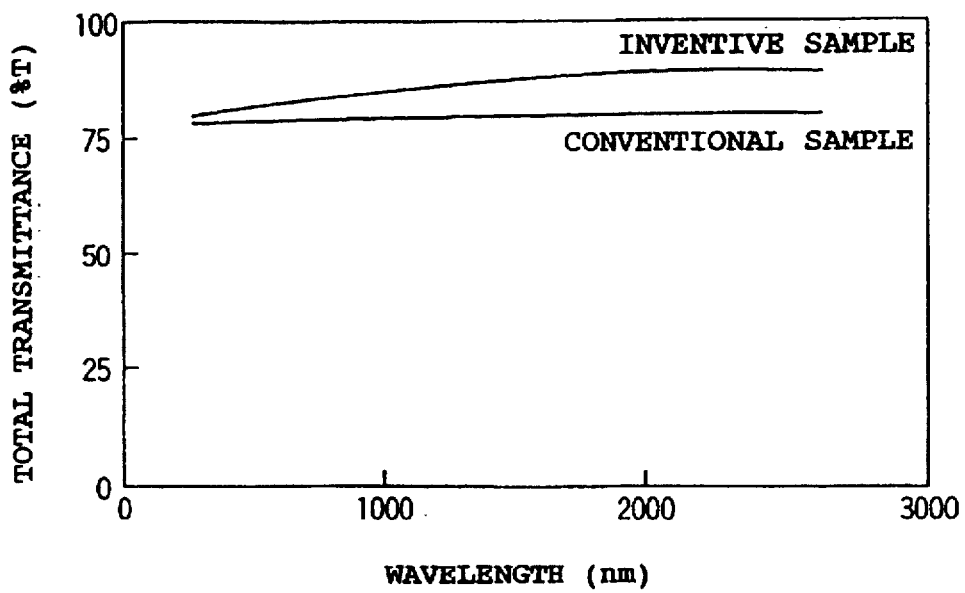
Figure 12:
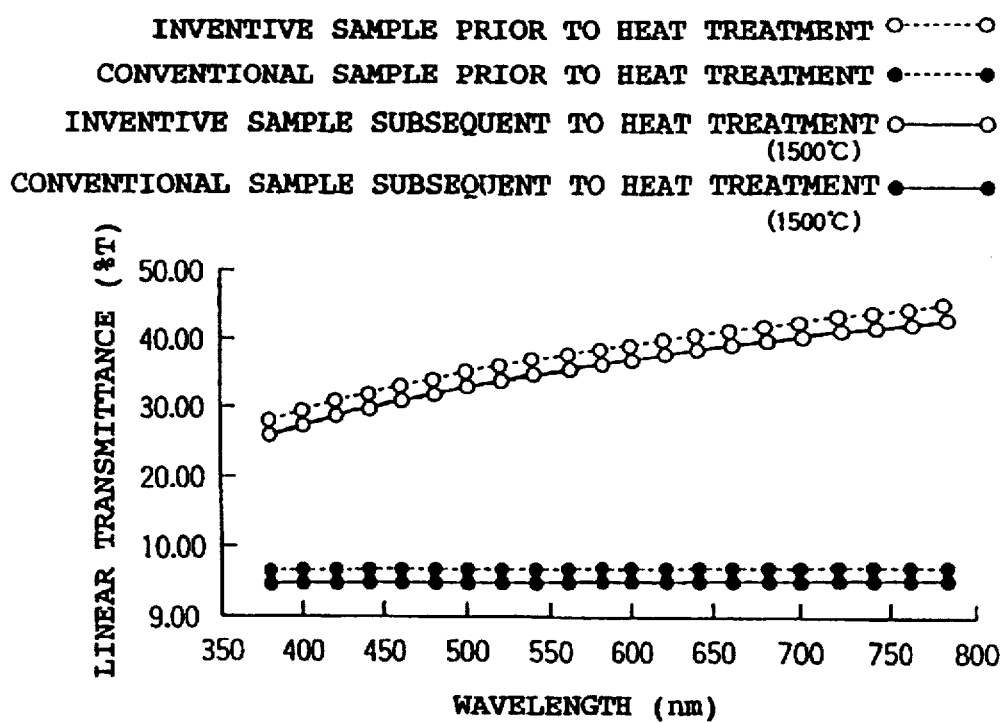
Figure 13:
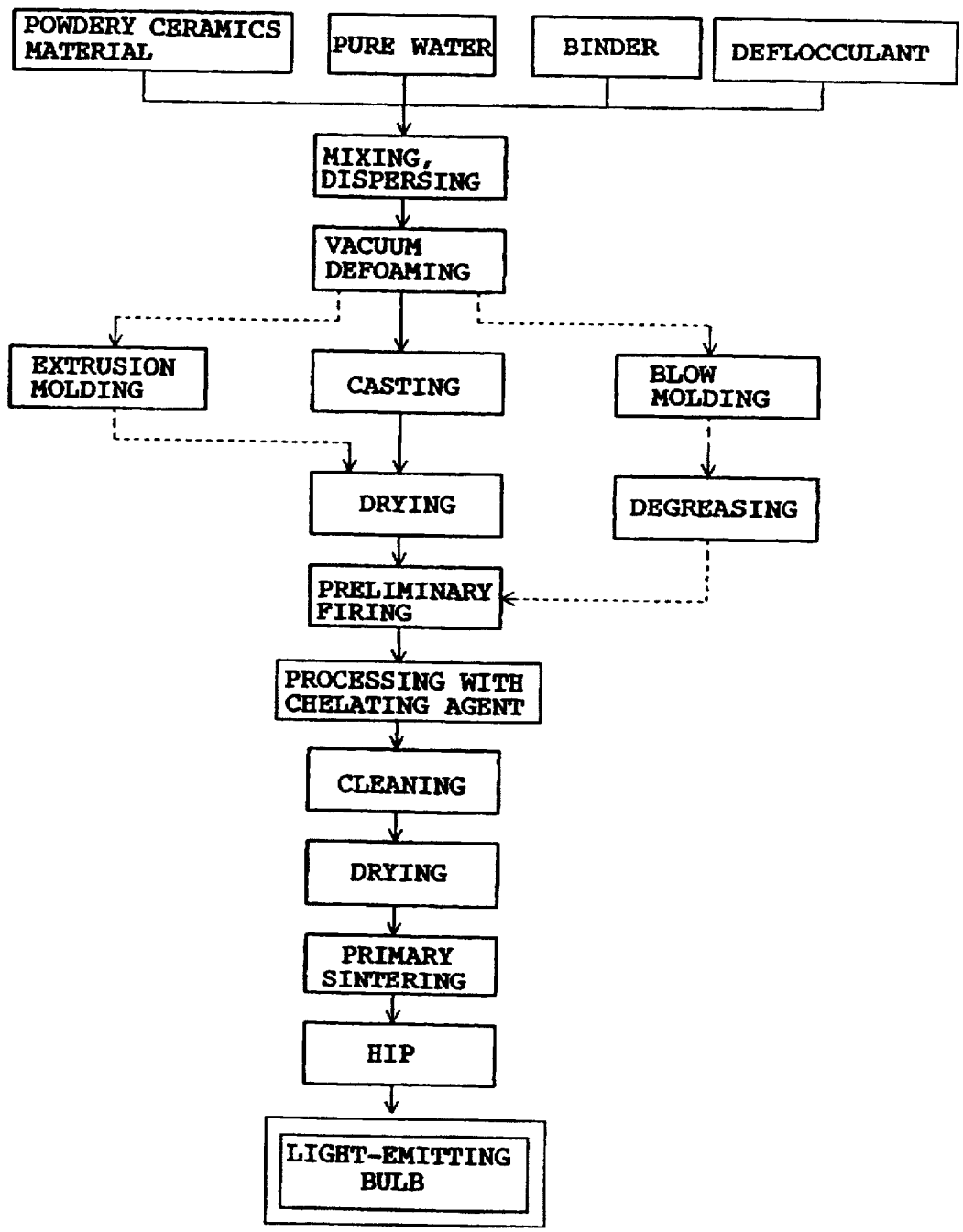
Figure 14:
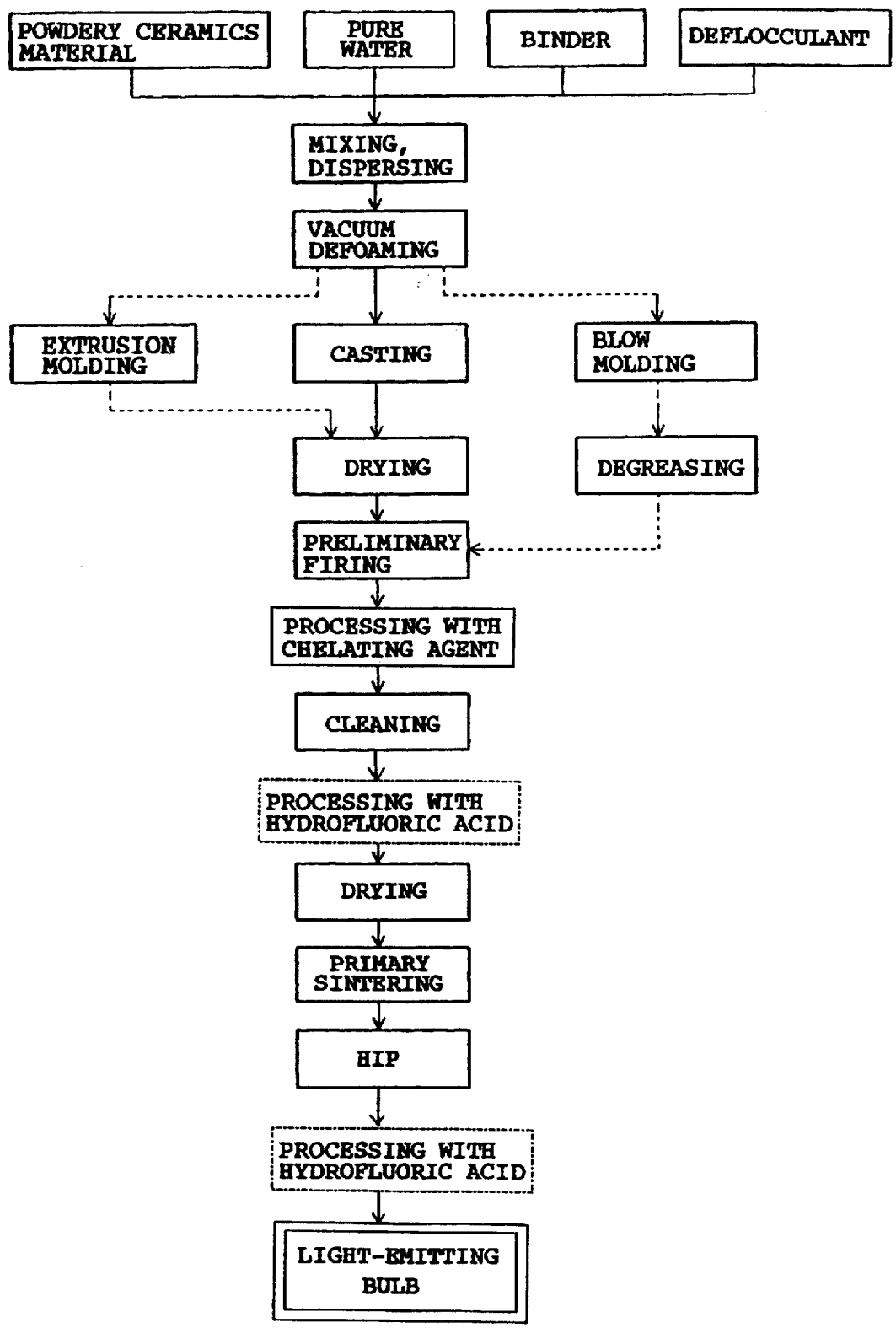
Figure 15:
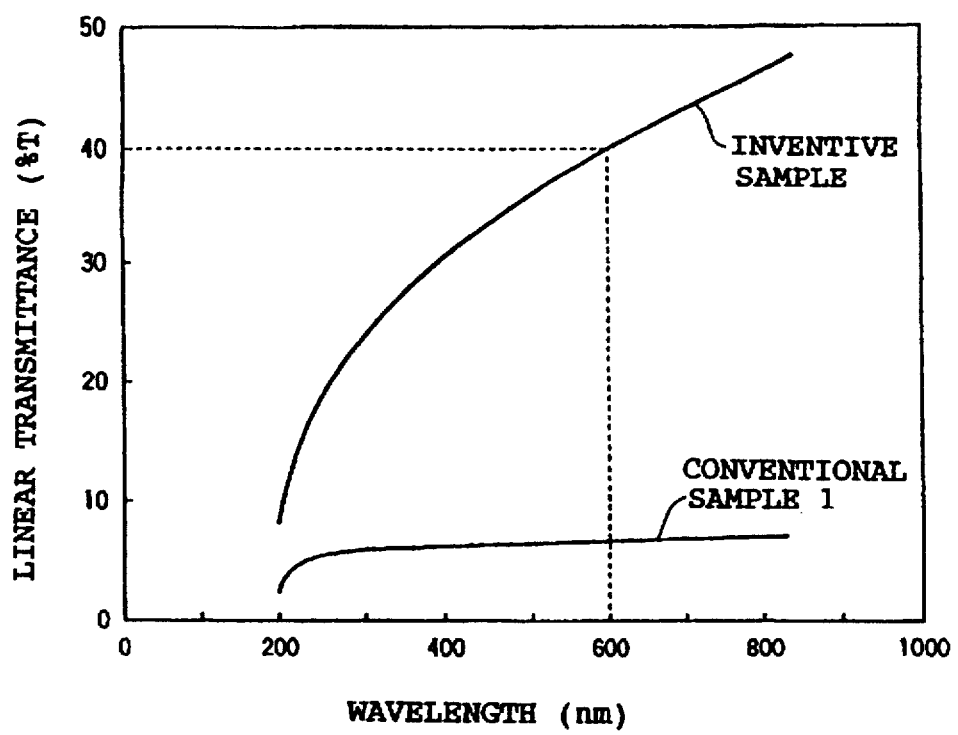

FIGS. 5(A1), 5(A2), and 5(A3) are representations of microscopic scanned images showing the structures of light-transmissive ceramics manufactured by the method shown in FIG. 1 according to the first embodiment of the present invention;

FIGS. 6(B1), 6(B2), and 6(B3) are representations of microscopic scanned images showing the structures of conventional light-transmissive ceramics manufactured by a conventional method;

FIG. 7 is a graph showing particle diameter distributions of the light-transmissive ceramics shown in FIGS. 5(A1), 5(A2), and 5(A3) and FIGS. 6(B1), 6(B2), and 6(B3);

FIG. 8 is a graph showing the relationship between the crystal particle diameters of $Al_2O_3$, linear transmittances, bending strengths, and thermal shock resistances of the light-transmissive ceramics shown in FIGS. 5(A1), 5(A2), and 5(A3) and FIGS. 6(B1), 6(B2), and 6(B3);

FIG. 9 is a schematic view of the structure of light-transmissive ceramics manufactured by the method according to the first embodiment of the present invention;

FIG. 10 is a graph showing the relationship between the surface roughness and light transmittance of the light-transmissive ceramics manufactured by the method according to the first embodiment of the present invention;

FIG. 11 a graph showing, for comparison, the total transmittances (diffused transmittances) of the light-transmissive ceramics according to the present invention and the conventional light-transmissive ceramics;

FIG. 12 is a graph showing, for comparison, the linear transmittances of the light-transmissive ceramics according to the present invention and the conventional light-transmissive ceramics before and after they are heat-treated at 1500° C. in the atmosphere;

FIG. 13 is a block diagram of a method of manufacturing light-transmissive ceramics according to a second embodiment of the present invention;

FIG. 14 is a block diagram of a method of manufacturing light-transmissive ceramics according to a third embodiment of the present invention;

FIG. 15 is a graph showing, for comparison, the linear transmittances of the light-transmissive ceramics manufactured by the method according to the second embodiment of the present invention and conventional light-transmissive ceramics (composition: $MgO—Al_2O_3$).

BEST MODE FOR CARRYING OUT THE INVENTION

Light-transmissive ceramics according to preferred embodiments of the present invention and methods of manufacturing same will be described in detail below with reference to the drawings.

Light-transmissive ceramics according to a first embodiment of the present invention and a method of manufacturing same have been achieved based on the recognition of the fact that the light transmittance of light-transmissive ceramics can be increased by meeting the requirements that (a) no air bubbles be contained in the light-transmissive ceramics, (b) the light-transmissive ceramics have a small surface roughness (Ra), (c) the light-transmissive ceramics be free of abnormal grain growth, and (d) the light-transmissive ceramics be made of a material having a negatively large standard Gibbs energy of formation ($\Delta Gf°$) for higher corrosion resistance.

The light-transmissive ceramics according to the first embodiment is composed of $Al_2O_3$ and at least one oxide whose standard Gibbs energy of formation ($\Delta Gf°$) has a negative value of $-1581.9$ KJ/mol or higher, and is obtained by hot isostatic pressing (HIP) at a high temperature under a high gas pressure. The light-transmissive ceramic is of a composite structure with at least one type of oxide particles such as of $La_2O_3$, $Sc_2O_3$, $Ta_2O_3$, $Ho_2O_3$, or the like being present between particles of $Al_2O_3$. Maximum size particles of $Al_2O_3$ have a longer axis of 30 μm or less and a shorter axis of 20 μm or less, and maximum size particles of the oxide have a longer axis of 10 μm or less and a shorter axis of 5 μm or less.

If the longer axis of the maximum size particles of $Al_2O_3$ were larger than 30 μm or the shorter axis thereof were larger than 20 μm, or if the longer axis of the maximum size particles of the oxide larger than 10 μm or the shorter axis thereof were larger than 5 μm, then the light-transmissive ceramics would have an insufficient mechanical strength and would not withstand grinding or machining.

With reference to FIG. 1, a method of manufacturing the light-transmissive ceramics according to the first embodiment comprises the steps of adding 0.01–18 wt % of $La_2O_3$ in the form of a salt or an oxide to a powder of highly pure alumina to form an unfired molded ceramics body, holding the molded ceramics body in an atmosphere of either vacuum, atmospheric air, $N_2$, Ar, $H_2$, or water vapor at a temperature ranging from 1350° C. to 1800° C. for at least 0.5 hour, thereby producing a primary sintered body, and then subjecting the primary sintered body to hot isostatic pressing at a high temperature under a high gas pressure.

If the added amount of $La_2O_3$ were less than 0.01 wt %, then abnormal grain growth would be seen in the light-transmissive ceramics, and if greater than 18 wt %, then the light transmission capability of the light-transmissive ceramics would be greatly impaired.

The molded ceramics body is fired in an atmosphere of either vacuum, atmospheric air, $N_2$, Ar, $H_2$, or water vapor in order to complete densification thereof.

The molded ceramics body is fired at a temperature ranging from 1350° C. to 1800° C. because if it were fired at a temperature lower than 1350° C., then it would not be fired sufficiently, and if it were fired at a temperature higher than 1800° C., then the added $La_2O_3$ would make a solid solution with $Al_2O_3$, resulting in the absorption of black bodies.

The molded ceramics body is fired for at least 0.5 hour because if it were fired for less than 0.5 hour, then it would be difficult to achieve a uniform sintered structure.

The hot isostatic pressing is preferably carried out at a temperature ranging from 1300° C. to 1800° C. in an atmosphere of Ar, $N_2$, $H_2$, or $O_2$ under a pressure ranging from 500 atm to 1200 atm.

The hot isostatic pressing is carried out at a temperature ranging from 1300° C. to 1800° C. because if it were carried out at a temperature lower than 1300° C., then no sufficient light transmission capability would be obtained, and if it were carried out at a temperature higher than 1800° C., then the added $La_2O_3$ would make a solid solution with $Al_2O_3$, resulting in the absorption of black bodies.

The hot isostatic pressing is carried out under a pressure ranging from 500 atm to 1200 atm because if it were carried out under a pressure less than 500 atm, then no sufficient light transmission capability would be obtained, and if it were carried out under a pressure higher than 1200 atm, then cracking would take place in the light-transmissive ceramics.

When the primary sintered body is processed by the hot isostatic pressing, it is possible to eliminate air bubbles in the light-transmissive ceramics. Since the light-transmissive ceramics is of a composite structure with particles such as of $La_2O_3$ being present between particles of $Al_2O_3$, rather than an oxide with $La_2O_3$ added forming a solid solution, the sintered ceramics body is free of abnormal grain growth and composed of particles of uniform size. Because the particles of the sintered ceramics body are relatively small, the thermal shock resistance and the mechanical strength thereof are high. Consequently, the light transmission capability of the light-transmissive ceramics is increased when its surface roughness (Ra) is increased by lapping or the like.

Inasmuch as the light-transmissive ceramics includes an oxide whose standard Gibbs energy of formation ($\Delta Gf°$) has a negative value of $-1581.9$ KJ/mol or higher (MgO has $\Delta Gf°=-569.4$ KJ/mol), the light-transmissive ceramic is thermodynamically stable and its reactability with a light-emitting substance, particularly Sc, is low, the corrosion resistance thereof is increased.

Heretofore, light-transmissive alumina ceramics with MgO added have had poor light transmission capability and poor mechanical strength because the grain boundary thereof is eroded due to a reaction between MgO present in the grain boundary of $Al_2O_3$ and a light-emitting substance, particularly Sc.

According to this embodiment, since the light-transmissive ceramics include an oxide whose standard Gibbs energy of formation ($\Delta Gf°$) has a negative value of $-1581.9$ KJ/mol or higher, i.e., an oxide having thermodynamic stability greater than $Al_2O_3$, almost no erosion of the grain boundary of $Al_2O_3$ owing to a reaction with a light-emitting substance, particularly Sc, takes place. This is to be contrasted with the conventional ceramic including MgO ($\Delta Gf°=-569.4$ KJ/mol).

Oxides whose standard Gibbs energy of formation ($\Delta Gf°$) have a negative value of $-1581.9$ KJ/mol or higher, i.e., the value of $Al_2O_3$ or higher, include $La_2O_3$ ($-1706$ KJ/mol), $Ta_2O_3$ ($-1911$ KJ/mol), $Ho_2O_3$ ($-1791$ KJ/mol), $Y_2O_3$ ($-1727$ KJ/mol), $Yb_2O_3$ ($-1727$ KJ/mol), $Dy_2O_3$ ($-1772$ KJ/mol), $Sc_2O_3$ ($-1819$ KJ/mol), $Ce_2O_3$ ($-1706$ KJ/mol), $Er_2O_3$ ($-1809$ KJ/mol), $Lu_2O_3$ ($-1789$ KJ/mol), $Sm_2O_3$ ($-1735$ KJ/mol), $Tm_2O_3$ ($-1795$ KJ/mol), and so on.

The composite light-transmissive ceramics of $La_2O_3/Al_2O_3$ with $La_2O_3$ being present between particles of $Al_2O_3$ according to this embodiment will be described below with reference to the drawings.

FIG. 1 shows in block form a method of manufacturing the light-transmissive ceramics of $La_2O_3/Al_2O_3$ according to the first embodiment of the present invention, the process including a hot isostatic pressing (HIP) step. In the first embodiment, a material of $Al_2O_3$, a material of $La_2O_3$, pure water, a binder, and a dispersant are mixed and dispersed in a wet matter, defoamed in vacuum, and cast into a molded body. The molded body is thereafter dried and fired into a primary sintered body, which is then subjected to HIP.

Instead of being cast into a molded body, the mixed materials may be extrusion-molded or blow-molded as indicated in the drawing. If the mixed materials are blow-molded, then no pure water is added to the materials, and the molded body is fired into a primary sintered body after being degreased.

The starting material of $Al_2O_3$ is a material derived from a matrix salt of AACH (ammonium-aluminumcarbonate-hydroxide) and having a purity of 4N (4 nines) or higher and particle diameters ranging from 0.05 μm to 1.0 μm. The starting material of $La_2O_3$ is a material having a purity of 3N or higher and particle diameters ranging from 0.1 μm to 2.0 μm.

The binder is made of methyl cellulose, polyvinyl alcohol, acrylic emulsion, sugar alcohol, or the like. The dispersant is made of an ammonium salt such as polycarboxylic acid, polyacrylic acid, or the like.

The material of $La_2O_3$ is added in a range of from 0.01 wt % to 18 wt % to the material of $Al_2O_3$ ranging from 99.8 wt % to 82 wt %. To the mixture (powdery mixture), there are added the binder and the dispersant in a range of from 0.2% to 1% and the pure water in a range of from 20% to 100%. The mixed constituents are then mixed in a wet manner for 10 hours by a ball mill, thereby producing a slurry.

If necessary, an anti-foaming agent is added to the slurry to defoam the slurry in vacuum. Thereafter, the slurry is cast into a plaster mold, a porous resin mold, or a porous ceramics mold, thereby forming an unfired, molded, ceramics body.

The unfired, molded, ceramics body is in the form of a light-emitting bulb for a high-intensity discharge lamp. According to the casting process, the slurry may be molded into any of various shapes, e.g., a light-emitting bulb having sealed ends whose diameter is ½ or less of the diameter of its central region, the sealed ends smoothly blending into the central region. The light-emitting bulb of the above configuration prevents a metal vapor from leaking out, is free of cracks, and has a high light emission efficiency.

Since a component of Ca may be mixed into the molded ceramics body, the molded ceramics body may be preliminarily fired and cleaned in hot water (acid) after it has been molded, for thereby removing any component of Ca.

After the unfired molded ceramics body as a light-emitting bulb has been dried, it is fired into the primary sintered body in an atmosphere of either vacuum, atmospheric air, $N_2$, Ar, $H_2$, or water vapor at a temperature ranging from 1350° C. to 1800° C. for at least 0.5 hour. The primary sintered body has a bulk density of 98% or higher.

Thereafter, the primary sintered body is subjected to HIP. FIG. 2 shows a HIP device for processing the primary sintered body with HIP. As shown in FIG. 2, the HIP device has a water-cooled jacket 2 disposed around a pressure vessel 1 having upper and lower ends closed by respective upper and lower lids 3, 4. The pressure vessel 1 houses therein a heat-insulating layer 7 in surrounding relation to a crucible 6. A heater 8 is disposed inwardly of the heat-insulating layer 7. The space inside of the pressure vessel 1 is connected to a vacuum pump 11 and a compressor 12 through pipes 9, 10 that extend through the lower lid 4.

Light-emitting bulbs 5 in the form of primary sintered bodies are placed in the crucible 6, and beads 13 of the same materials as the light-emitting bulbs 5 are filled in the crucible 6 above the light-emitting bulbs 5. With the light-emitting bulbs 5 covered with the beads 13, the crucible 6 is set in the space inside of the pressure vessel 1. Then, the light-emitting bulbs 5 are subjected to HIP. The sintering of the light-emitting bulbs 5 is sufficiently completed because they are fired while the beads 13 of the same materials as the light-emitting bulbs 5 are filled in the crucible 6.

The beads 13 may alternatively be of the same principal material, e.g., $Al_2O_3$, of the light-emitting bulbs 5, or of a material of a grain growth inhibitor, e.g., MgO. If a grain growth inhibitor which is not of the same material as the light-emitting bulbs is used, then the grain growth inhibitor may possibly remain as an impurity on the surfaces of the light-emitting bulbs. Since the impurity exists only on the surfaces of the light-emitting bulbs, it can easily be removed subsequently. Under normal conditions, the crucible 6 that is made of a grain growth inhibitor is not involved in the inhibition of grain growth at all. At a high temperature of 1350° C. or higher and under a high pressure of 500 atm or higher, however, the crucible 6 that is made of a grain growth inhibitor is considered to inhibit grain growth in surface boundaries of the sintered alumina bodies because the constituent elements of the crucible 6 exist in the atmosphere.

Figure 3:
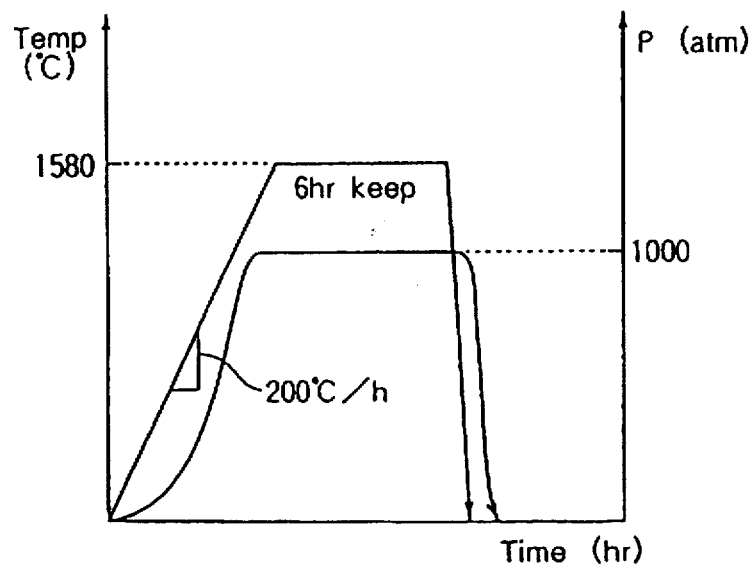
FIG. 3 is a graph showing a pattern of the hot isostatic pressing step.

One example of conditions of the HIP is shown in FIG. 3. The HIP is carried out by increasing the temperature from the room temperature up to 1580° C. at a rate of 200°/h, and then holding the temperature of 1580° C. for six hours. At the same time that the temperature is increased, the internal pressure is increased, and then held at 1000 atmospheric pressures for six hours. An atmospheric gas is composed of at least one of $N_2$, Ar, $H_2$, and $O_2$.

Figure 4:
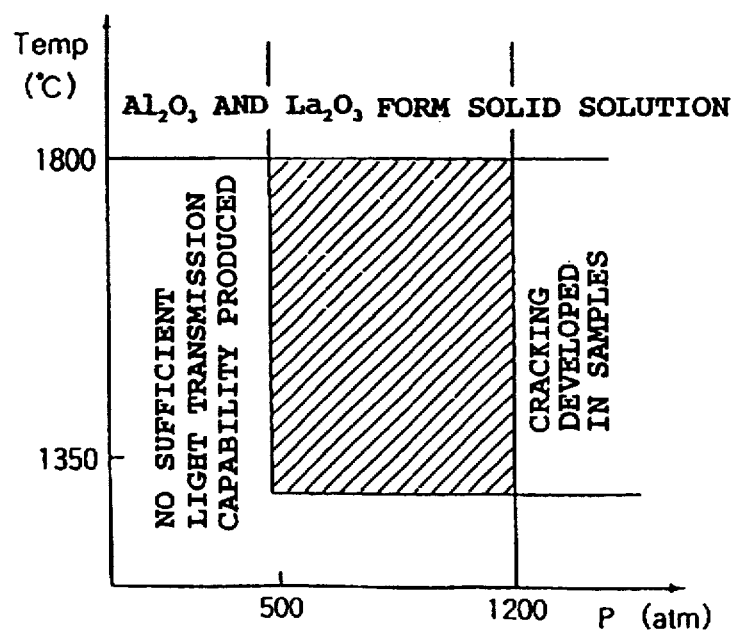
FIG. 4 is a graph showing the relationship between conditions (temperature and pressure) of the hot isostatic pressing step and the occurrence of deficiencies.

FIG. 4 is a graph showing a preferable range of conditions for the HIP. As can be seen from FIG. 4, no sufficient light transmission capability would be achieved at a temperature lower than 1300° C., and $La_2O_3$ would make a solid solution with $Al_2O_3$, resulting the absorption of black bodies, if the temperature exceeded 1800° C. No sufficient light transmission capability would be achieved under a pressure lower than 500 atm, and cracks would be developed if the pressure exceeded 1200 atm. Therefore, the HIP should preferably be carried out at a temperature ranging from 1300° C. to 1800° C. under a pressure ranging from 500 atm to 1200 atm.

FIGS. 5(A1), 5(A2), and 5(A3) are representations of microscopic scanned images showing the structures of light-transmissive ceramics (A1)–(A3) manufactured under the above conditions according to the above embodiment of the present invention, and FIGS. 6(B1), 6(B2), and 6(B3) are representations of microscopic scanned images showing the structures of conventional light-transmissive ceramics (B1)–(B3) manufactured by a conventional method. Details of the conditions under which these light-transmissive ceramics are manufactured are given below.

(A1) . . . $La_2O_3$ 0.5 wt % added 1580° C., 1000 atm (inventive)

(A2) . . . $La_2O_3$ 0.5 wt % added 1800° C., 1000 atm (inventive)

(A3) . . . $La_2O_3$ 0.06 wt % added 1580° C., 1000 atm (inventive)

(B1) . . . $La_2O_3$ not added 1350° C., 1000 atm (conventional)

(B2) . . . MgO 0.05 wt % added 1800° C., in a stream of hydrogen (conventional)

(B3) . . . $La_2O_3$ not added 1800° C., 1000 atm (conventional)

The light-transmissive ceramics indicated by (A1)–(A3), (B1)–(B3) are arranged successively in the ascending order of average crystal particle diameter of $Al_2O_3$ as shown in the graph of FIG. 7. FIG. 8 is a graph showing the linear transmittances, bending strengths, and thermal shock resistances of the light-transmissive ceramics (A1)–(A3), (B1)–(B3).

It can be seen from these graphs that the conventional light-transmissive ceramics (B1) has a small average crystal particle diameter of $Al_2O_3$ and a sharp crystal particle diameter distribution curve, and is satisfactory with respect to bending strength and thermal shock resistance though its linear transmission is not sufficient, as shown in FIG. 8.

The conventional light-transmissive ceramics (B2), (B3) have high linear transmission because their average crystal particle diameters of $Al_2O_3$ are small, but have wide crystal particle diameter distribution curves and suffers high abnormal grain growth. As a result, the conventional light-transmissive ceramics (B2), (B3) have poor bending strength and thermal shock resistance.

As shown in FIG. 9, the structures of the inventive light-transmissive ceramics (A1), (A2), and (A3) are of composite nature with particles of $La_2O_3$ being present between particles of $Al_2O_3$, rather than $La_2O_3$ forming a solid solution with $Al_2O_3$. The particles of $La_2O_3$ serve to inhibit the growth of the particles of $Al_2O_3$. The structures of the inventive light-transmissive ceramics (A1), (A2), and (A3) are effective in absorbing and inhibiting the development of cracks under various stresses.

In the composite bodies of the light-transmissive ceramics, the particles of $La_2O_3$ have sizes that are ⅓ to 1/30 those of the particles of $Al_2O_3$. Maximum size particles of $Al_2O_3$ have a longer axis of 30 μm or less and a shorter axis of 20 μm or less, and maximum size particles of $La_2O_3$ or the like have a longer axis of 10 μm or less and a shorter axis of 5 μm or less. Both the particles of $La_2O_3$ and the particles of $Al_2O_3$ do not essentially contain abnormal grain growth particles whose diameters are three times or more the average crystal particle diameter, and have sharp diameter distribution curves.

As a consequence, as shown in FIG. 8, either of the inventive light-transmissive ceramics (A1), (A2), and (A3) has a linear transmission of 4% or higher at a wavelength of 600 nm, and high bending strength and thermal shock resistance.

FIG. 10 is a graph showing the relationship between the surface roughness and light transmittance of the light-transmissive ceramics manufactured by the casing process according to the first embodiment of the present invention, the light-transmissive ceramics including an inner surface having an excellent average surface roughness (Ra) of 0.09 μm and an outer surface which is ground (lapped). Since the light-transmissive ceramics according to the present invention has a mechanical strength sufficient to withstand grinding, the outer surface may be ground to an average surface roughness of 0.1 μm or less.

The light-transmissive ceramics manufactured according to the conventional method have an average surface roughness (Ra) of about 2.7 μm and are not sufficiently strong. When the surfaces of the conventional light-transmissive ceramics are ground, they suffer cracks and hence are less light-transmissive.

Particularly, if a molded ceramics body is produced by extrusion molding, then since particles of $Al_2O_3$ are not crystallographically isotropic, the direction in which cracks are produced in resulting light-transmissive ceramics has certain regularity.

FIG. 11 a graph showing, for comparison, the total transmittances (diffused transmittances) of the light-transmissive ceramics according to the present invention and the conventional light-transmissive ceramics. It can be seen that the light-transmissive ceramics according to the present invention are better than the conventional light-transmissive ceramics with respect to the total transmittance.

FIG. 12 is a graph showing, for comparison, the linear transmittances of the light-transmissive ceramics according to the present invention and the conventional light-transmissive ceramics before and after they are heat-treated at 1500° C. in the atmosphere. A study of FIG. 12 indicates that the light-transmissive ceramics according to the present invention are better than the conventional light-transmissive ceramics with respect to heat resistance.

As can be understood from the above description and the results of tests effected on the samples shown in FIGS. 4 through 11, $La_2O_3$ can effectively be used as a grain growth inhibitor by adding 0.01–18 wt % of $La_2O_3$ in the form of a salt or an oxide to a powder of highly pure alumina according to the manufacturing method of the present invention.

According to the manufacturing method of the present invention, furthermore, the mixed powder of highly pure alumina is fired into a primary sintered body under given conditions, and the primary sintered body is subjected to hot isostatic pressing at a predetermined high temperature under a predetermined high gas pressure. Therefore, the particle diameters of $Al_2O_3$ are reduced (the light-transmissive ceramics shown in FIGS. 5(A1), 5(A2) have the same added amount of $La_2O_3$ but are subjected to HIP under different conditions), so that their light transmission capability and mechanical strength characteristics are expected to have a wide range.

According to the present invention, moreover, the light-transmissive ceramic is of a composite structure with particles of $La_2O_3$ or the like being present between particles of $Al_2O_3$, and maximum size particles of $Al_2O_3$ have a longer axis of 30 μm or less and a shorter axis of 20 μm or less, and maximum size particles of $La_2O_3$ or the like have a longer axis of 10 μm or less and a shorter axis of 5 μm or less. Consequently, if the light-transmissive ceramic is in the form of a tube having a thickness of 0.75 mm, then it provides an in-line transmittance (linear transmittance) of 4% or higher and a total transmittance of 75% or higher with respect to visible light having a wavelength of 600 nm (as measured by Double-beam spectrophotometers U-2000, U-4000 manufactured by Hitachi, Ltd.), and has much greater thermal shock resistance and mechanical strength than the conventional light-transmissive ceramics.

Inasmuch as the light-transmissive ceramic according to the present invention is of high mechanical strength, it can sufficiently withstand lapping. Therefore, the average surface roughness is minimized to reduce surface diffusion for a greatly increased light transmission capability.

Since the light-transmissive ceramic includes an oxide whose standard Gibbs energy of formation ($\Delta Gf^\circ$) has a negative value of −1581.9 KJ/mol or higher, i.e., an oxide having thermodynamic stability greater than $Al_2O_3$, almost no erosion of the grain boundary of $Al_2O_3$ owing to a reaction with a light-emitting substance, particularly Sc, takes place unlike MgO ($\Delta Gf^\circ$=−569.4 KJ/mol).

When the unfired molded ceramics body is fired into a primary sintered body according to the first embodiment, it is fired according to such a heat curve that the temperature is increased up to a sintering temperature of 1350° C., for example, and then kept at the sintering temperature until the firing of the molded ceramics body is completed. Because the firing process progresses slowly, however, the molded body may possibly be warped or $SiO_2$ evaporated from the heater material may possibly enter the molded ceramics body from its surface and be trapped in the sintered body, tending to deteriorate the light-emitting bulb.

To avoid the above drawback, the unfired molded ceramics body is first heated up to a temperature higher than the above sintering temperature (e.g., 1350° C.→1400° C.), and after the surface of the molded ceramics body is sintered (e.g., in five minutes), the temperature is lowered down to the sintering temperature (1350° C.) at which the molded ceramics body is continuously fired. Since the surface of the molded ceramics body has already been sintered, the inside of the molded ceramics body can be sintered while its shape is being maintained, and hence the molded ceramics body is prevented from being warped while being fired. Even when evaporated $SiO_2$ is attached to the surface of the molded ceramics body, it does not enter the molded ceramics body, and the attached $SiO_2$ can easily be removed in a subsequent step.

Light-transmissive ceramics according to a second embodiment of the present invention and a method of manufacturing such light-transmissive ceramics will be described below with reference to the drawings. The light-transmissive ceramics according to the second embodiment and the method of manufacturing same differ from the light-transmissive ceramics according to the first embodiment and the method of manufacturing same in that a molded ceramics body is processed by a chelating agent with a view to removing ions of impurity metals such as Ca, Mg, etc. mixed in the molded ceramics body, after it has been preliminarily fired, but before it has been subjected to the primary sintering step.

The inventors have found that even if impurities are removed from the materials using a chelating agent, when the completed light-transmissive ceramic is used as a material of a light-emitting bulb for a high-intensity discharge lamp, impurities newly introduced while the molded ceramics body is being produced are mainly responsible for the elimination of a light-emitting substance from the light-emitting bulb. Stated otherwise, the inventors have found that even though the materials are highly pure, it is not possible to completely prevent impurities from being introduced into the materials when the materials are being subsequently molded. According to the second embodiment, after a ceramics body molded to a given shape is preliminarily fired, the preliminarily fired ceramics body is impregnated with a chelating agent, allowing ions of impurity metals in the preliminarily fired ceramics body to be coupled to the chelating agent. Then, the chelating agent impregnated in the preliminarily fired ceramics body is removed by cleaning, after which the preliminarily fired ceramics body is fired. Specifically, the preliminarily fired ceramics body is ultrasonically cleaned to effectively remove the chelating agent impregnated in the preliminarily fired ceramics body together with the impurity metals. The chelating agent is composed of EDTA, for example, with a pH ranging from 8 to 10 for mainly removing Ca and Mg and leaving La or the like that is effective to increase corrosion resistance.

A light-emitting bulb made of the light-transmissive ceramics according to the second embodiment is primarily composed of $(Al.Sc)_2O_3$, which is equivalent to $Al_2O_3$ where part of Al is replaced with Sc, and does not essentially contain Ca, Mg, and Si. The light-emitting bulb has a linear transmittance of 40% or higher per thickness of 1 mm with respect to light having a wavelength of 600 nm, a mechanical strength of 235 MPa or higher, a thermal shock resistance of 150 $\Delta T°C$. or greater, a thermal conductivity of 0.08 cal/cm.sec.°C. or greater, and a softening point of 1200° C. or higher.

After the ceramics body is fully fired, since the pores thereof are closed, it is not possible to impregnate the fired ceramic body with the chelating agent to the inside of the fired ceramic body, or to remove the impregnated chelating agent together with the impurities. However, the preliminarily fired ceramics body can be impregnated with the chelating agent to the inside thereof, and the chelating agent coupled to ions of impurity metals of Mg, Si, etc. can be removed from within the preliminarily fired ceramics body because pores thereof are continuous. Since the preliminarily fired ceramics body is closer in its state to the final ceramics body than the powdery materials, there is little chance for impurities to be mixed into the preliminarily fired ceramics body in the preliminarily firing step and subsequent steps.

FIG. 13 shows in block form a method of manufacturing the light-transmissive ceramics according to the second embodiment of the present invention. In the second embodiment, a material of $Al_2O_3$, a material of $Sc_2O_3$, a material of $La_2O_3$, which are powdery ceramics materials, pure water, a binder, a deflocculant, and a dispersant are mixed and dispersed in a wet manner, defoamed in vacuum, and cast into a molded body. The molded body is thereafter dried into an unfired molded ceramics body, which is then preliminarily fired.

Instead of being cast into a molded body, the mixed materials may be extrusion-molded or blow-molded as indicated in the drawing. If the mixed materials are blow-molded, then no pure water is added to the materials, and the molded body is fired into a primary sintered body after being degreased.

After the unfired molded ceramics body is preliminarily fired, the preliminarily fired ceramics body is processed by a chelating agent, allowing ions of impurity metals in the preliminarily fired ceramics body to be coupled to the chelating agent. Then, the chelating agent impregnated in the preliminarily fired ceramics body, i.e., the chelating agent that has entrapped the ions of impurity metals, is removed out of the preliminarily fired ceramics body with pure water by ultrasonic cleaning. Thereafter, the preliminarily fired ceramics body is fired into a primary fired ceramic body, which is then subjected to HIP thereby producing a light-emitting bulb of light-transmissive ceramics.

The starting material of $Al_2O_3$ is a material derived from a matrix salt of AACH (ammonium.aluminum.carbonate.hydroxide) and having a purity of 4N (4 nines) or higher and particle diameters ranging from 0.05 μm to 1.0 μm. The starting material of $Sc_2O_3$ is a material having a purity of 3N or higher and particle diameters ranging from 0.5 μm to 10 μm. The starting material of $La_2O_3$ is a material having a purity of 3N or higher and particle diameters ranging from 0.1 μm to 2.0 μm.

The binder is made of methyl cellulose, polyvinyl alcohol, acrylic emulsion, sugar alcohol, or the like. The dispersant is made of an ammonium salt such as polycarboxylic acid, polyacrylic acid, or the like.

If the mixed materials are to be cast into a plaster mold, a porous resin mold, or a porous ceramics mold, then the material of $Sc_2O_3$ is added in a range of from 0.005 wt % to 15 wt % and the material of $La_2O_3$ is added in a range of from 0.01 wt % to 18 wt % with the remainder of the mixture being $Al_2O_3$. To the mixture (powdery mixture), there are added the binder and the dispersant in a range of from 0.2% to 1% and the pure water in a range of from 20% to 100%. The constituents are then mixed in a wet manner for 10 hours by a ball mill, thereby producing a slurry.

The unfired molded ceramics body is preliminarily fired at a temperature ranging from 600° C. to 1200° C. so as to achieve a porosity ranging from about 20% to 50%. In the second embodiment, the porosity is an important factor. If the porosity were too large, the preliminarily fired ceramics body would have insufficient mechanical strength and would not be handled with ease. If the porosity were too small, the chelating agent would not be impregnated in the preliminarily fired ceramics body in a subsequent step, making it impossible to process the preliminarily fired ceramics body with the chelating agent.

To impregnate the preliminarily fired ceramics body with the chelating agent, the preliminarily fired ceramics body is immersed in an aqueous solution of chelating agent, and air bubbles in the preliminarily fired ceramics body are removed by a vacuum pump for one hour or longer.

The chelating agent may comprise EDTA, DPTA, EDDA, or EDDP, and the chelating agent in the aqueous solution should preferably have such a concentration that it contains a number of moles at least twice the total number of moles of impurities to be removed.

The aqueous solution of chelating agent (EDTA) should preferably have a pH ranging from 8 to 10. When the preliminarily fired ceramics body is processed by a chelating agent having such a pH, the chelating agent is selectively coupled to metal ions. That is, Ca, Mg, etc. are coupled to the chelating agent and removed, and La and Sc that have been added as starting materials are left.

As a result, the produced light-emitting bulb is of a composite nature with particles of $La_2O_3$ being present between particles of $(Al.Sc)_2O_3$, which is equivalent to $Al_2O_3$ where part of Al is replaced with Sc. The sintered ceramics body is free of abnormal grain growth and composed of particles of uniform size. Because the particles of the sintered ceramics body are relatively small, the thermal shock resistance and the mechanical strength thereof are high. With $Sc_2O_3$ introduced, no reaction progresses between a light-emitting substance of Sc or the like and $Al_2O_3$. Since the standard Gibbs energy of formation ($\Delta Gf^°$) of $La_2O_3$ is −1706.0 KJ/mol which is of a negative value larger than the standard Gibbs energy of formation of $Al_2O_3$ which is −1581.9 KJ/mol, the sintered ceramics body is thermodynamically stable and its reactability with a light-emitting substance such as Sc is low, with the result that the corrosion resistance thereof is increased.

The chelating agent which has entrapped the impurity metal ions is then removed out of the preliminarily fired ceramics body with pure water by ultrasonic cleaning based on the difference between concentrations. Thereafter, the preliminarily fired ceramics body is dried, and then fired into a primary sintered body in an atmosphere of either vacuum, atmospheric air, $N_2$, Ar, $H_2$, or water vapor at a temperature ranging from 1350° C. to 1800° C. for at least 0.5 hour. The primary sintered body has a bulk density of 98% or higher.

Thereafter, the primary sintered body is subjected to hot isostatic pressing (HIP). The hot isostatic pressing is preferably carried out at a temperature ranging from 1300° C. to 1800° C. under a pressure ranging from 500 atm to 1200 atm. Specifically, the HIP is carried out by increasing the temperature from the room temperature up to 1580° C. at a rate of 200°/h. and then holding the temperature of 1580° C. for six hours. At the same time that the temperature is increased, the internal pressure is increased, and then held at 1000 atmospheric pressures for six hours. An atmospheric gas is composed of at least one of Ar, $N_2$, $H_2$, and $O_2$.

FIG. 14 shows in block form a method of manufacturing light-transmissive ceramics according to a third embodiment of the present invention, which is a modification of the method of manufacturing light-transmissive ceramics according to the second embodiment. In the third embodiment, the ceramics body is processed by a hydrofluoric acid (HF) after it has been processed by the chelating agent and/or subjected to the HIP step.

When the ceramics body is processed by the chelating agent, Ca and Mg can be reduced to ¹⁄₁₀ of the initial amounts thereof. However, the chelating agent is not as effective with respect to Si. If Si ($SiO_3$) is contained in the ceramics body, it gives rise to the following reaction, eliminating a light-emitting substance ($ScI_3$):

$$3SiO_2 + 4ScI_3 \rightarrow 2Sc_2O_3 + 3SiI_4$$

Therefore, after the cleaning step or the HIP step, the ceramics body is processed by a hydrofluoric acid (HF) to remove Si. The ceramics body may processed by a hydrofluoric acid (HF) before it is processed by the chelating agent. However, if the ceramics body is processed by a hydrofluoric acid (HF) before it is processed by the chelating agent, the hydrofluoric acid reacts with calcium or magnesium, generating a product that cannot easily be removed after being processed by the chelating agent. For this reason, the ceramics body should preferably be processed by a hydrofluoric acid (HF) after it is processed by the chelating agent.

Table 1 below shows, for comparison, characteristics of light-transmissive ceramics produced according to the above method of the present invention (without the processing using the hydrofluoric acid) and characteristics of conventional light-transmissive ceramics. FIG. 15 is a graph showing, for comparison, the linear transmittances of the light-transmissive ceramics according to the present invention and the conventional light-transmissive ceramics (composition: MgO—$Al_2O_3$).

TABLE 1

| Characteristics | Conventional example 1 | Conventional example 2 | Inventive example |
|---|---|---|---|
| Composition | MgO—$Al_2O_3$ | $SiO_2$ | $(Al,Sc)_2O_3$—$La_2O_3$ |
| Linear transmittance (%) | 7 | 93 | 40 or higher |
| Diffused transmittance (%) | 95 | 97 | 95 |
| Mechanical strength (MPa) | 235 | 150 | 350 |
| Thermal conductivity (cal/cm · sec · °C.) | 0.08 | 0.004 | 0.16 |
| Thermal shock resistance ($\Delta T$°C. | 150 | 40 | 200 |
| Softening point (°C.) | 1200 | 900 | 1500 |
| Corrosion resistance index (KJ/mol) | 560 | 856 | 1706–1819 |
| He gas permeation | No | Yes | No |

It can be understood from Table 1 and FIG. 15 that the light-transmissive ceramics according to the present invention has a linear transmittance of 40% or higher per thickness of 1 mm with respect to light having a wavelength of 600 nm, a mechanical strength of 235 MPa or higher, a thermal shock resistance of 150 $\Delta T$°C. or greater, a thermal conductivity of 0.08 cal/cm.sec.°C. or greater, and a softening point of 1200° C. or higher. The inventive light-transmissive ceramic has much better characteristics, in all areas except for the linear transmittance, than the conventional light-transmissive ceramics of $SiO_2$, and has much better characteristics, in all areas except diffused transmittance, where it has an equivalent characteristic than the conventional light-transmissive ceramics of MgO—$Al_2O_3$.

According to the second embodiment of the present invention, as described above, the preliminarily fired ceramics body is impregnated with the chelating agent, allowing ions of impurity metals in the preliminarily fired ceramics body to be coupled to the chelating agent. Then, the chelating agent impregnated in the preliminarily fired ceramics body is removed by cleaning. Therefore, the impurities can be removed from the preliminarily fired ceramics body which is closer to the final product. Since impurities are unlikely to be subsequently introduced into the fired ceramic body or light-emitting bulb, the resulting high-intensity discharge lamp has very high quality and a prolonged service life.

Because the preliminarily fired ceramics body is ultrasonically cleaned, the chelating agent impregnated in the preliminarily fired ceramics body is effectively removed together with the impurity metals. After the preliminarily fired ceramics body is processed by the chelating agent, or after the preliminarily fired ceramics body is fired, the ceramics body is processed by a hydrofluoric acid to effectively remove Si. The chelating agent is composed of EDTA, for example, with a pH ranging from 8 to 10 for mainly removing Ca and Mg and leaving La or the like that is effective to increase corrosion resistance.

A light-emitting bulb made of light-transmissive ceramics manufactured according to the above method has a linear transmittance of 40% or higher per thickness of 1 mm with respect to light having a wavelength of 600 nm, a mechanical strength of 235 MPa or higher, a thermal shock resistance of 150 $\Delta T°C$. or greater, a thermal conductivity of 0.08 cal/cm.sec.°C. or greater, and a softening point of 1200° C. or higher, as reflected in the Inventive example of Table 1 in which several of the characteristic properties have much higher values than the indicated minimums.

INDUSTRIAL APPLICABILITY

Light-transmissive ceramics according to the present invention have excellent characteristics including mechanical strength, linear transmission, corrosion resistance, and thermal shock resistance, and can be used in a variety of applications including a light-emitting bulb for a high-intensity discharge lamp because of such excellent characteristics. Although there have been described what are at present considered to be the preferred embodiments of the invention, it will be understood that variations and modifications may be made thereto without departing from the spirit and essence of the invention. The scope of the invention is indicated by the appended claims.

We claim:

1. A light-transmissive ceramic consisting essentially of a plurality of oxides, each oxide in the ceramic having a negative standard Gibbs energy of formation ($\Delta Gf°$) having an absolute value greater than 1581.9 KJ/mol, said light-transmissive ceramic being produced by subjecting the oxides to hot isostatic pressing at a high temperature under a high pressure.

2. A light-transmissive ceramic according to claim 1, wherein said light-transmissive ceramic comprises a composite body including $Al_2O_3$ as one of said oxides, in which particles of at least one of said oxides, different from $Al_2O_3$, are present between particles of $Al_2O_3$, and wherein maximum size particles of $Al_2O_3$ have a longer axis of 30 μm or less and a shorter axis of 20 μm or less, and maximum size particles of said at least one of the oxides, different from $Al_2O_3$, have a longer axis of 10 μm or less and a shorter axis of 5 μm or less.

3. A light-transmissive ceramic according to claim 1, wherein said light-transmissive ceramic contains a principal component of $Al_2O_3$ and an auxiliary component comprising an oxide selected from the group consisting of $La_2O_3$, $Ta_2O_3$, $Ho_2O_3$, $Y_2O_3$, $Yb_2O_3$, $Dy_2O_3$, $Sc_2O_3$, $Ce_2O_3$, $Er_2O_3$, $Lu_2O_3$, $Sm_2O_3$, and $Tm_2O_3$.

4. A light-transmissive ceramic according to claim 1, wherein said oxides are at least processed with a chelating agent and then subjected to a primary sintering before being subjected to said hot isostatic pressing.

5. A light-transmissive ceramic composed of a plurality of oxides, each oxide in the ceramic having a negative standard Gibbs energy of formation ($\Delta Gf°$) having an absolute value greater than 1581.9 KJ/mol said light-transmissive ceramic being produced by subjecting the oxide to hot isostatic pressing at a high temperature under a high pressure; and said light-transmissive ceramic comprising a composite body composed of a principal constituent of $(Al,Sc)_2O_3$ and particles of $La_2O_3$ present between particles of $(Al,Sc)_2O_3$.

6. A light-transmissive ceramic comprising:
   a principal component of alumina particles and an auxiliary component of particles of at least other oxide different from alumina having a negative standard Gibbs energy of formation ($\Delta Gf°$) with an absolute value greater than 1581.9 KJ/mol;
   maximum size particles of alumina having a longer axis of $\leq 30$ μm and a shorter axis of $\leq 20$ μm, and maximum size particles of said at least one other oxide different from alumina having a longer axis of $\leq 10$ μm has a shorter axis of $\leq 5$ μm; and
   said particles of said at least one other oxide different from alumina being present between said particles of alumina in a composite body.

7. A light-transmissive ceramic according to claim 1, wherein said ceramic has substantially no air bubbles therein due to said hot isostatic pressing.

8. A light-transmissive ceramic according to claim 1, wherein said ceramic is further processed by lapping or grinding a surface thereof to a surface roughness of $\leq 0.1$ μm.

9. A light-transmissive ceramic according to claim 1, wherein said oxides are further processed with hydrofluoric acid after the hot isostatic pressing.

10. A light-transmissive ceramic according to claim 4, wherein said oxides are further processed with hydrofluoric acid after being subjected to said hot isostatic pressing.

11. A light-transmissive ceramic according to claim 1, wherein said light-transmissive ceramic comprises a composite body including essentially pure $Al_2O_3$ as a principal constituent and 0.01–18 wt % of $La_2O_3$ as a minor constituent.

* * * * *

UNITED STATES PATENT AND TRADEMARK OFFICE
CERTIFICATE OF CORRECTION

PATENT NO. : 5,780,377
DATED : 14 July 1998
INVENTOR(S) : Naohito Wajima, Tetsuaki Bundo, Koichi Hayashi It is certified that error appears in the above-identified patent and that said Letters Patent is hereby corrected as shown below:

On the title page, under "Abstract", 16th line, after "Before" delete "an".

Column 1, line between numbers 32 and 33, change "a of" to --of a--.

Column 2, in the two equations at approximately lines 27-28, at the end of line 27 delete "$Al_2O_3+$", and correct the equation on line 28 to read --$Al_2O_3 + ScI_3 \rightarrow AlScO_3 + AlI_3$--.

Column 3, 13th line, after "$Tm_2O_3$." begin a new paragraph;
line 44, after "Sc." begin a new paragraph.

Column 4, line 26, after "11" insert --is--;
line 66, change "ceramics" to --ceramic--.

Column 5, 15th line, after "oxide" insert --were--.

Column 6, line 1, change "ceramics" to --ceramic--;
line 2, change "ceramics" to --ceramic--;
10th line, change "ceramics" to --ceramic--;
12th line, change "ceramics" to --ceramic--.

Column 7, line 13, before the period insert --as indicated in the drawing--.

Column 8, line 58, change "ceramics" to --ceramic--;
line 66, change "suffers" to --suffer--.

Column 9, line 50, after "11" insert --is--.

Column 11, line 66, change "preliminarily" to --preliminary--.

UNITED STATES PATENT AND TRADEMARK OFFICE
CERTIFICATE OF CORRECTION

PATENT NO. : 5,780,377
DATED : 14 July 1998
INVENTOR(S) : Naohito Wajima, Tetsuaki Bundo, Koichi Hayashi It is certified that error appears in the above-identified patent and that said Letters Patent is hereby corrected as shown below:

Column 13, line 60, change "($SiO_3$)" to --($SiO_2$)--.

Column 14, in "TABLE 1", in the 13th line of print in the leftmost column, after "( T°C." insert a right parenthesis;
    line 41, change "ceramics" to --ceramic--;
    line 51, after "characteristics" delete the comma;
    line 52, after "characteristic" insert a comma.

Column 15, at line number 30, after "characteristics." begin a new paragraph with "Although".

Signed and Sealed this

Sixteenth Day of March, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO : 5,780,377
DATED : 14 July 1998
INVENTOR(S): Naohito Wajima, Tetsuaki Bundo, Koichi Hayashi It is certified that error appears in the above-identified patent and that said Letters Patent is hereby corrected as shown below:

On the cover page, change the line "[22] Filed: May 2, 1995" to
—[22] PCT Filed: August 30, 1994—, and immediately thereafter insert the following information:
—[86] PCT No.: PCT/JP94/01429
  § 371 Date: July 7, 1995
  § 102(e) Date: July 7, 1995
  [87] PCT Pub. No.: WO95/06622
  PCT Pub. Date: March 9, 1995
  [30] Foreign Application Priority Data
  Sept. 2, 1993 [JP] Japan ............... 5-242025
  Feb. 28, 1994 [JP] Japan ............... 6-29853—.

Signed and Sealed this

Eighteenth Day of April, 2000

Attest:

Attesting Officer

Q. TODD DICKINSON

Director of Patents and Trademarks